United States Patent
Li

(10) Patent No.: US 12,456,490 B2
(45) Date of Patent: Oct. 28, 2025

(54) METHOD AND APPARATUS FOR VIDEO SEEKING AND PLAYING, TERMINAL DEVICE AND STORAGE MEDIUM

(71) Applicant: Beijing Bytedance Network Technology Co., Ltd., Beijing (CN)

(72) Inventor: Shinan Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 217 days.

(21) Appl. No.: 18/259,028

(22) PCT Filed: Nov. 23, 2021

(86) PCT No.: PCT/CN2021/132557
§ 371 (c)(1),
(2) Date: Jun. 22, 2023

(87) PCT Pub. No.: WO2022/134997
PCT Pub. Date: Jun. 30, 2022

(65) Prior Publication Data
US 2024/0233767 A1    Jul. 11, 2024

(30) Foreign Application Priority Data
Dec. 23, 2020    (CN) .......................... 202011540293.4

(51) Int. Cl.
*G11B 27/00*    (2006.01)
*G06F 3/04855*    (2022.01)
(Continued)

(52) U.S. Cl.
CPC .......... *G11B 27/005* (2013.01); *G06F 3/0488* (2013.01); *G11B 27/34* (2013.01); *G06F 3/04855* (2013.01)

(58) Field of Classification Search
CPC ..... G11B 27/005; G11B 27/34; G06F 3/0488; G06F 3/04855; H04N 21/238;
(Continued)

(56) References Cited

U.S. PATENT DOCUMENTS

2012/0134646 A1    5/2012  Alexander
2012/0166950 A1*   6/2012  Frumar ............... G06F 3/04847
                                                 715/719
(Continued)

FOREIGN PATENT DOCUMENTS

CN    104469519 A    3/2015
CN    109743617 A    5/2019
(Continued)

OTHER PUBLICATIONS

China National Intellectual Property Administration, Notice of Allowance Issued in Application No. 202011540293.4, Apr. 26, 2023, 2 pages.
(Continued)

*Primary Examiner* — Asher D Kells
(74) *Attorney, Agent, or Firm* — Alleman Hall & Tuttle LLP

(57) ABSTRACT

A method and apparatus for video seeking and playing, a terminal device, a storage medium, and a computer program product, and the method includes: obtaining first seeking information input by a user; determining a first playing node
(Continued)

indicated by the first seeking information; predicting, according to the first seeking information, a second playing node, and buffering a target video frame corresponding to the second playing node in a buffering pool, where the second playing node is after the first playing node; and obtaining second seeking information input by the user, and if a playing node indicated by the second seeking information is the second playing node, playing the target video frame in the buffering pool.

17 Claims, 9 Drawing Sheets

(51) Int. Cl.
*G06F 3/0488* (2022.01)
*G11B 27/34* (2006.01)

(58) Field of Classification Search
CPC ............... H04N 21/433; H04N 21/472; H04N 21/23805; H04N 21/4331
See application file for complete search history.

(56) References Cited

U.S. PATENT DOCUMENTS

| 2014/0026052 | A1 | 1/2014 | Thorwirth et al. |
| 2015/0350700 | A1* | 12/2015 | Pantos ................. H04N 21/631 725/90 |
| 2017/0111672 | A1* | 4/2017 | Ramamurthy ... H04N 21/64322 |
| 2018/0213274 | A1* | 7/2018 | Song ................. H04N 21/47217 |
| 2020/0145701 | A1* | 5/2020 | Liu ......................... H04N 5/783 |

FOREIGN PATENT DOCUMENTS

| CN | 110166817 A | 8/2019 |
| CN | 110719524 A | 1/2020 |
| CN | 110740373 A | 1/2020 |

OTHER PUBLICATIONS

China National Intellectual Property Administration, Office Action and Search Report Issued in Application No. 202011540293.4, Nov. 11, 2022, 17 pages.

China National Intellectual Property Administration, International Search Report and Written Opinion Issued in Application No. PCT/CN2021/132557, Jan. 6, 2022, WIPO, 14 pages.

\* cited by examiner

METHOD AND APPARATUS FOR VIDEO SEEKING AND PLAYING, TERMINAL DEVICE AND STORAGE MEDIUM

CROSS-REFERENCE TO RELATED APPLICATIONS

This application is a national stage of International Application No. PCT/CN2021/132557, filed on Nov. 23, 2021, which claims priority to Chinese patent application No. 202011540293.4, filed on Dec. 23, 2020. Both of the aforementioned applications are hereby incorporated by reference in their entireties.

TECHNICAL FIELD

Embodiments of the present disclosure relate to the field of computer technology, and in particular, to a method and apparatus for video seeking and playing, a terminal device, a storage medium, and a computer program product.

BACKGROUND

With the development of the mobile Internet, demands for video decoding such as playing a video on a mobile terminal are expanding. However, due to limited performance of a mobile device, a large number of video frame raw data cannot be buffered for the upper layer in a decoder design scheme.

In an existing technology, a common situation is that after a decoder is started, a device buffers a certain amount of video frame data and suspends decoding, and when the buffered data is consumed by an upper layer application program until there is free buffering space, the decoder is started again and performs decoding until the buffering pool is full, and the process repeats to ensure that there is always video frame data available for the upper layer.

However, in addition to a normal play, a user often has the need to a seeking play, that is, to manually change the playing node of a video, when a quick seeking on the video is required, due to a quick seeking operation, the device cannot decode in time and seek to a target playing position of a video, therefore, a problem of video lag which affects the normal play of the video is caused, reducing user experience.

SUMMARY

The embodiments of the present disclosure provide a method and apparatus for video seeking and playing, a terminal device, a storage medium, and a computer program product, in order to overcome the problem of video lag during a seeking operation which affects a normal play of a video.

In a first aspect, the embodiments of the present disclosure provide a method for video seeking and playing, including: obtaining first seeking information input by a user; determining a first playing node indicated by the first seeking information; predicting, according to the first seeking information, a second playing node, and buffering a target video frame corresponding to the second playing node in a buffering pool, where the second playing node is after the first playing node; and obtaining second seeking information input by the user, and if a playing node indicated by the second seeking information is the second playing node, playing the target video frame in the buffering pool.

In a second aspect, the embodiments of the present disclosure provide an apparatus for video seeking and playing, including:
an obtaining unit, configured to obtain first seeking information input by a user, and determine a first playing node indicated by the first seeking information;
a predicting unit, configured to predict, according to the first seeking information, a second playing node, and buffer a target video frame corresponding to the second playing node in a buffering pool, where the second playing node is after the first playing node; and
a playing unit, configured to obtain second seeking information input by the user, and if a playing node indicated by the second seeking information is the second playing node, play the target video frame in the buffering pool.

In a third aspect, the embodiments of the present disclosure provide a terminal device, including a touch screen, a controller, and a memory, where:
the touch screen is configured to obtain first seeking information input by a user;
the controller is configured to determine a first playing node indicated by the first seeking information; predict, according to the first seeking information, a second playing node, and buffer a target video frame corresponding to the second playing node in the memory, where the second playing node is after the first playing node; and
the touch screen is further configured to obtain second seeking information input by the user, and if a playing node indicated by the second seeking information is the second playing node, play the target video frame in the memory.

In a fourth aspect, the embodiments of the present disclosure provide an electronic device, including: at least one processor and a memory;
the memory stores a computer executable instruction; and
the at least one processor executes the computer executable instruction stored in the memory to enable the at least one processor to implement the method for video seeking and playing described in the above first aspect and various possible designs of the first aspect.

In a fifth aspect, the embodiments of the present disclosure provide a computer readable storage medium, the computer readable storage medium stores a computer executable instruction which, when executed by a processor, implements the method for video seeking and playing described in the above first aspect and various possible designs of the first aspect.

In a sixth aspect, the embodiments of the present disclosure provide a computer program product, including a computer program which, and when executed by a processor, implements the method for video seeking and playing described in the above first aspect and various possible designs of the first aspect.

In a seventh aspect, the embodiments of the present disclosure provide a computer program, which when executed by a processor implements the method for video seeking and playing described in the above first aspect and various possible designs of the first aspect.

The method and apparatus for video seeking and playing, the terminal device, the storage medium, and the computer program product are provided in the present embodiment, and the method includes obtaining first seeking information input by a user; determining a first playing node indicated by the first seeking information; predicting, according to the first seeking information, a second playing node, and buffering a target video frame corresponding to the second playing node in a buffering pool, where the second playing node is after the first playing node; and obtaining second seeking information input by the user, and if a playing node indicated by the second seeking information is the second playing node, playing the target video frame in the buffering pool. Since the target video frame is buffered in the buffering pool in advance, when video seeking and playing is performed according to the second seeking information, no real-time decoding process is required, and the buffered target video frame can be directly called for the video play, avoiding the problem of video lag during a seeking operation, improving smoothness of the video play during the video seeking play, and optimizing user experience.

BRIEF DESCRIPTION OF DRAWINGS

In order to more clearly illustrate technical solutions in the embodiments of the present disclosure or the related art, the following will briefly introduce drawings that need to be used in a description of the embodiments or the related art. Obviously, the drawings in a following description are some embodiments of the present disclosure, and the person skilled in the art may also obtain other drawings based on these drawings without any creative effort.

DESCRIPTION OF EMBODIMENTS

In order to make purposes, technical solutions and advantages of the embodiments of the present disclosure clearer, the technical solutions in the embodiments of the present disclosure will be clearly and completely described below in combination with the drawings in the embodiments of the present disclosure. Obviously, the described embodiments are some embodiments of the present disclosure, not all embodiments. Based on the embodiments in the present disclosure, all other embodiments obtained by the person of ordinary skill in the art without creative efforts fall within protection scope of the present disclosure.

Figure 1:
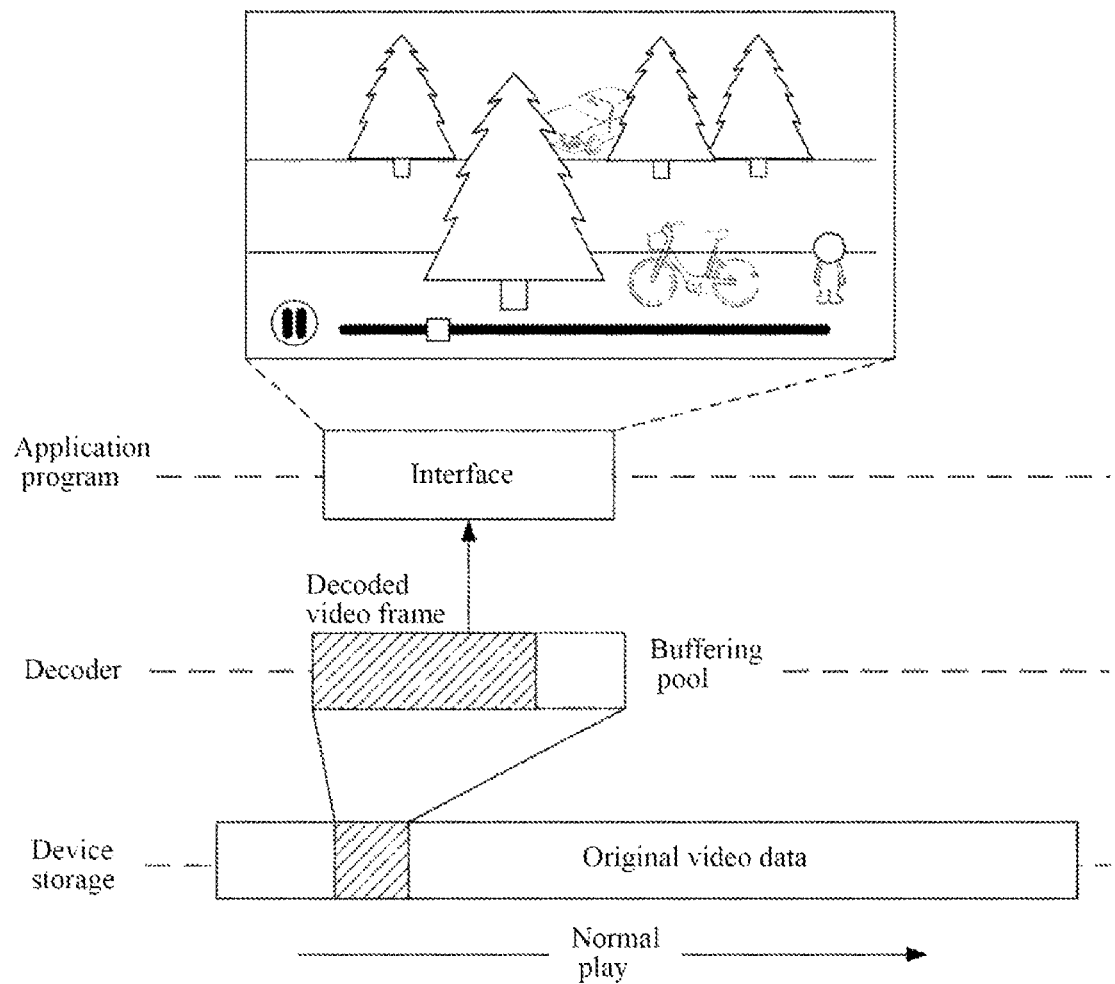
FIG. 1 is an example diagram of a normal video playing process in the related art.

FIG. 1 is an example diagram of a normal video playing process in the related art. Referring to FIG. 1, in the related art, original video data needs to be decoded before being played. When an application program calls a decoder to perform a video play, a decoding process and a playing process are usually performed at the same time. That is, after the decoder is started, a device buffers a certain amount of video frame data and suspends decoding, and when the buffered data is consumed by an upper layer application program until there is free buffering space, the decoder is started again and performs decoding until the buffering pool is full, and the process repeats to ensure that there is always video frame data available for the upper layer.

Figure 2:
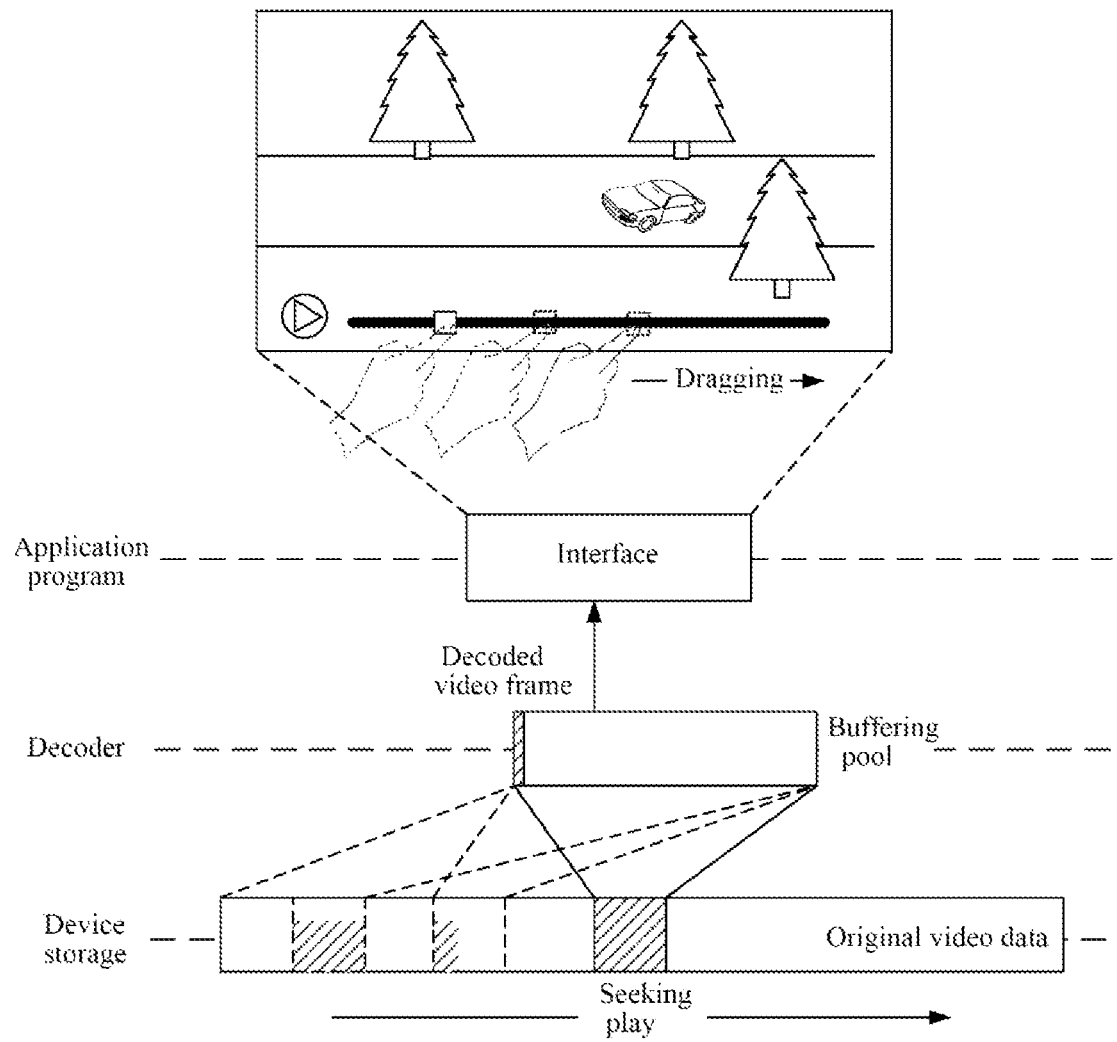
FIG. 2 is an example diagram of a video seeking and playing process in the related art.

However, in addition to a normal play, a user often has the need to a seeking play, that is, to manually change the node at which the video is played. FIG. 2 is an example diagram of a video seeking and playing process in the related art, referring to FIG. 2, when a quick seeking on the video is required, due to a quick seeking operation and a certain period of time required by a decoder to perform video data decoding, the device cannot finish the decoding for seeking to a target playing position of a video. Therefore, video lag after a video seeking is caused, affecting a normal play or preview of the video, reducing smoothness of the video play, and reducing user experience.

The embodiments of the present disclosure provide a method for video seeking and playing to solve the aforementioned problem.

Figure 3:
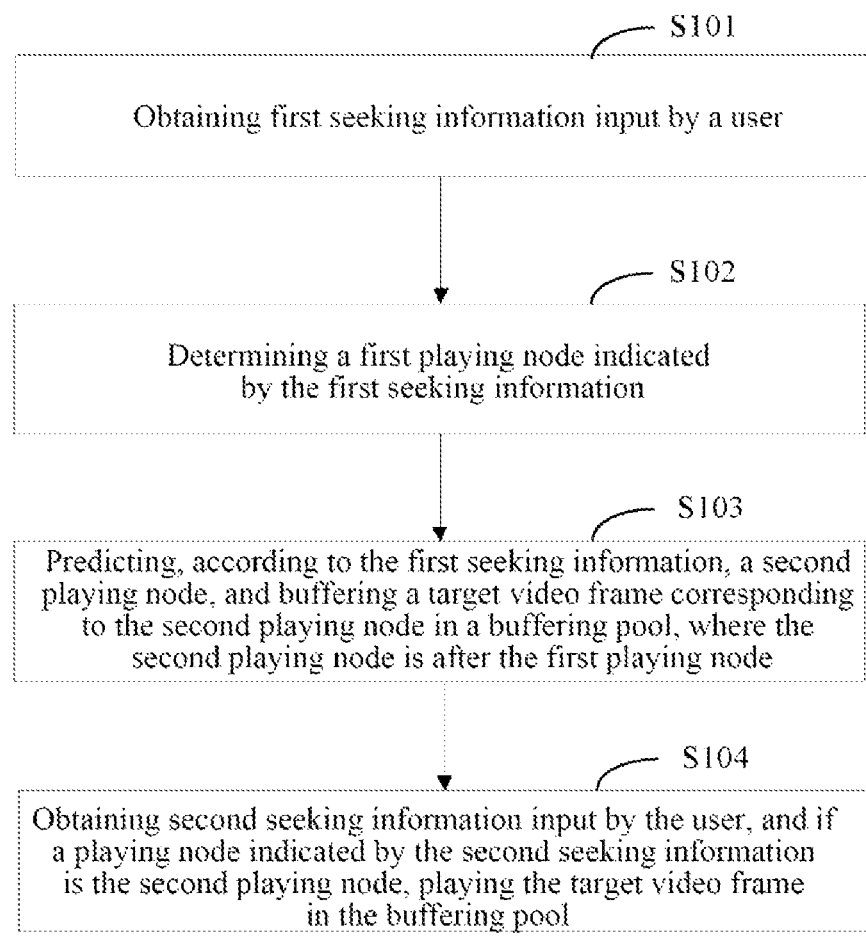
FIG. 3 is a first schematic flow diagram of a method for video seeking and playing provided by an embodiment of the present disclosure.

FIG. 3 is a first schematic flow diagram of a method for video seeking and playing provided by an embodiment of the present disclosure, the method of the present embodiment may be applied to a terminal device, and referring to FIG. 3, the method for video seeking and playing includes the following steps.

S101: obtaining first seeking information input by a user.

In the present embodiment, the first seeking information refers to instruction information input by the user to the terminal device to adjust video playing progress during a video playing process, for example, to adjust the video playing progress forward to 50%, and for another example, to return the video playing progress to 3 minutes, 05 seconds, etc. The specific implementation content of the first seeking information is not limited here, and is not repeated one by one.

There are many ways to obtain the first seeking information input by the user, the terminal device includes a touch screen, an application program for playing a video runs on the terminal device, according to the user interface (UI) of the application program, the user performs a touching operation on a specified position of the touch screen to control the application program to seek the video playing progress, and then, a control instruction corresponding to the touching operation input by the user, which is obtained by the terminal device through the touch screen, is the first seeking information.

Figure 4:
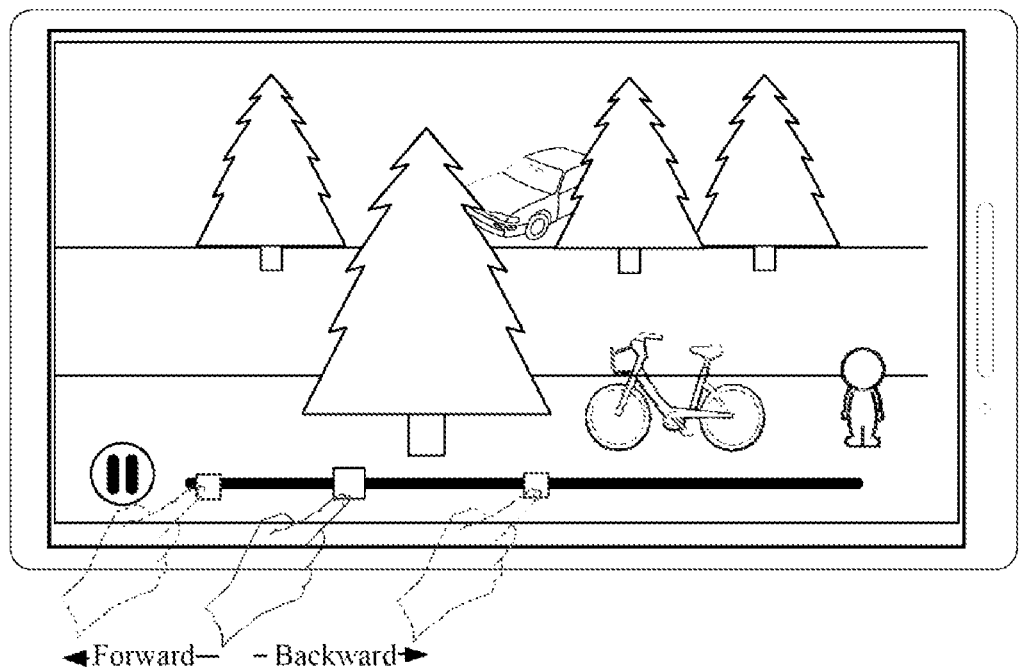
FIG. 4 is a schematic diagram of an application program UI provided by an embodiment of the present disclosure.

Specifically, in a possible implementation manner, a touching operation includes dragging or sliding a playing progress bar, FIG. 4 is a schematic diagram of an application program UI provided by an embodiment of the present disclosure, referring to FIG. 4, a progress bar is provided on the UI of the application program, and the user may realize seeking of the video by dragging the progress bar forward or backward on the touch screen. The terminal device obtains corresponding first seeking information through the touch screen.

Figure 5:
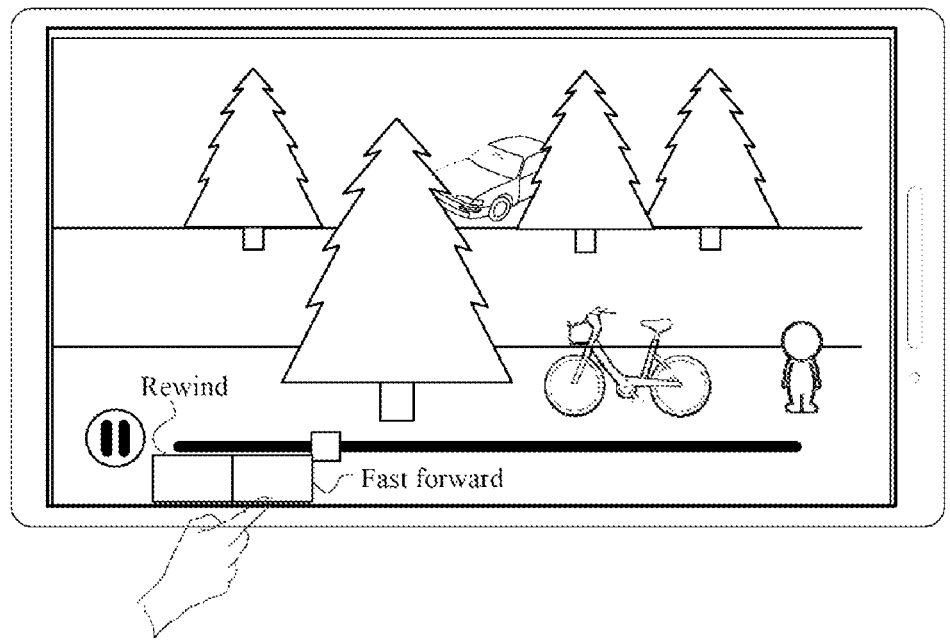
FIG. 5 is a schematic diagram of another application program UI provided by an embodiment of the present disclosure.

In another possible implementation manner, a touching operation includes clicking a seeking button such as "fast forward" or "rewind", FIG. 5 is a schematic diagram of another application program UI provided by an embodiment of the present disclosure, referring to FIG. 5, there are "fast forward" and "rewind" buttons on the UI of the application program, and the user may realize seeking of the video by clicking the "fast forward" or "rewind" button on the touch screen. Specifically, each time the user clicks the "fast forward" or "rewind" button, the video seeks backward or forward for a preset time. The faster the user clicks the "fast forward" or "rewind" button, the farther the video seeks backwards or forwards. For example, taking the user clicking "fast forward" as an example, when frequency of the user clicking "fast forward" is 1 time/second, the video is fast forwarded for 5 seconds each time; and when the frequency of the user clicking "fast forward" is 3 times/second, the video is fast forwarded 10 seconds each time. The terminal device obtains the corresponding seeking information through the touch screen.

S102: determining a first playing node indicated by the first seeking information.

For example, the first seeking information refers to the instruction information input by the user to the terminal device to adjust the video playing progress during the video playing process, and a target position of the video to which the terminal device seeks according to the first seeking information is the first playing node. More specifically, for example, the user drags the progress bar forward or backward on the touch screen to realize seeking of the video, and during a dragging operation of the user, a video position that the dragged progress bar has reached or passed is the first playing node.

S103: predicting, according to the first seeking information, a second playing node, and buffering a target video frame corresponding to the second playing node in a buffering pool, where the second playing node is after the first playing node.

In the present embodiment, the target video frame refers to a video frame that needs to be played or previewed on the terminal device, playing the target video frame may be to play only the target video frame, or to play the target video frame and video frames subsequent thereto continuously, which is not specifically limited here.

Specifically, the first seeking information may be obtained in a manner that the user perform a touching operation on the terminal device, etc., and due to a certain purpose of the user's operation behavior, there is also regularity of a seeking operation performed by the user, for example, sliding the progress bar. Therefore, according to a change rule of a seeking operation corresponding to the first seeking information, for example, a rule of speed change, a rule of rhythm change, etc., a position to be sought to may be predicted and the position to be sought to is the second playing node, video data at the predicted second playing node, that is, the target video frame, is decoded and buffered in advance, and when needed to be played later, the target video frame can be played directly without real-time decoding, avoiding the lag caused by the decoding.

After being decoded, the video data at the predicted second playing node is buffered in a preset buffering pool. The buffering pool may be a storage medium such as a hard disk or a memory in the terminal device and may be buffered through a wired transmission manner such as a bus; and the buffering pool may be a storage medium such as a hard disk or a memory in a cloud server or a network device and may be buffered through a wireless transmission manner, which is not limited specifically here and may be set according to specific demands.

S104: obtaining second seeking information input by the user, and if a playing node indicated by the second seeking information is the second playing node, playing the target video frame in the buffering pool.

For example, the second seeking information is similar to the first seeking information, and also refers to instruction information input by the user to the terminal device to adjust the video playing progress during the video playing process. A video position indicated by the predicted second playing node is a target position of the video to which the terminal device seeks according to the second seeking information. The second seeking information is information received after the first seeking information, in a possible implementation manner, the first seeking information and the second seeking information occur continuously, for example, the user realize the seeking of the video by dragging the progress bar forward or backward on the touch screen, and during dragging operations of the user, the first seeking information and the second seeking information are successively generated according to a dragging track of the progress bar, which are respectively used to indicate to the terminal device to seek to the first playing node and the target playing node, if the target playing node is the predicted second playing node, then the target video frame corresponding to the second playing node, which is buffered in the buffering pool, is played. Since the target video frame has been decompressed and buffered, there is no need to perform additional real-time decompression processing, thus time consumption is reduced.

In the embodiment of the present disclosure, the first seeking information input by a user is obtained; the first playing node indicated by the first seeking information is determined; the second playing node is predicted according to the first seeking information, and the target video frame corresponding to the second playing node is buffered in the buffering pool, where the second playing node is after the first playing node; and the second seeking information input by the user is obtained, and if the playing node indicated by the second seeking information is the second playing node, the target video frame in the buffering pool is played. Since the target video frame is buffered in the buffering pool in advance, when video seeking and playing is performed according to the second seeking information, no real-time decoding process is required, and the buffered target video frame can be directly called for the video play, avoiding the problem of video lag during a seeking operation, improving smoothness of the video play during the video seeking and playing, and optimizing user experience.

Figure 6:
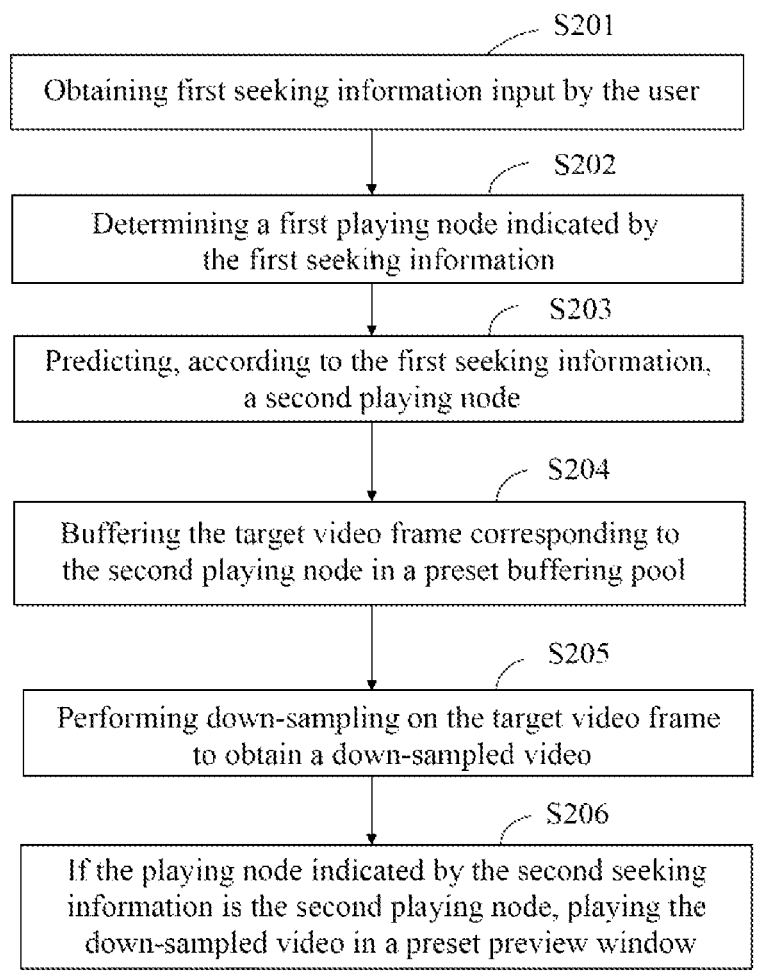
FIG. 6 is a second schematic flow diagram of a method for video seeking and playing provided by an embodiment of the present disclosure.

Referring to FIG. 6, FIG. 6 is a second schematic flow diagram of a method for video seeking and playing provided by an embodiment of the present disclosure. In the present embodiment, on the basis of the method for video seeking and playing provided in the embodiment shown in FIG. 3, step S103 is further detailed, and the method for video seeking and playing includes:

Step S201: obtaining first seeking information input by the user;

Step S202: determining a first playing node indicated by the first seeking information;

Step S203: predicting, according to the first seeking information, a second playing node.

Specifically, the first seeking information includes a plurality of seeking nodes, and there is a one-to-one mapping relationship between the seeking nodes and playing nodes of video data. The playing nodes are information used to represent playing positions of the video data, and according to the playing nodes, corresponding playing positions of the video data, that is, a video frame, may be determined.

Figure 7:
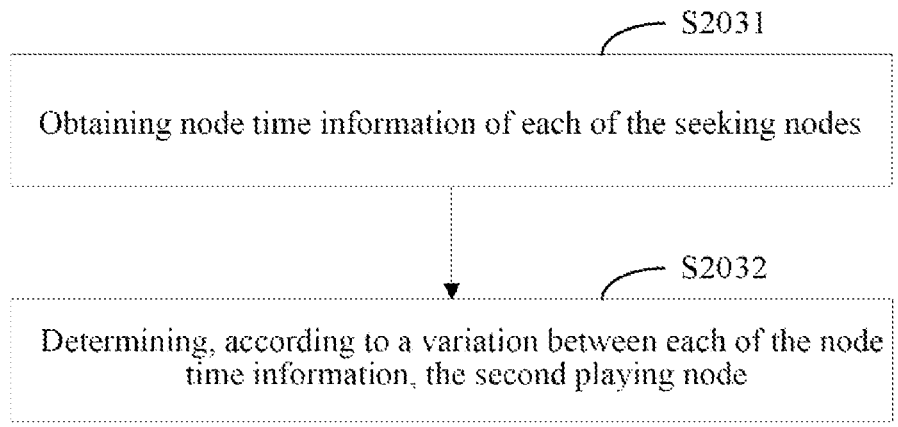
FIG. 7 is a possible implementation of step S203 provided by an embodiment of the present disclosure.

Referring to FIG. 7, FIG. 7 is a possible implementation of the step S203 provided by an embodiment of the present disclosure, where the step S203 includes the following steps.

Step S2031: obtaining node time information of each of the seeking nodes.

In the embodiment of the present disclosure, node time information of a seeking node is description information about time of the seeking node. For example, a seeking node A corresponds to 12 minutes, 03 seconds of a video, and node time information of the seeking node A includes the moment of 12 minutes, 03 seconds.

Figure 8:
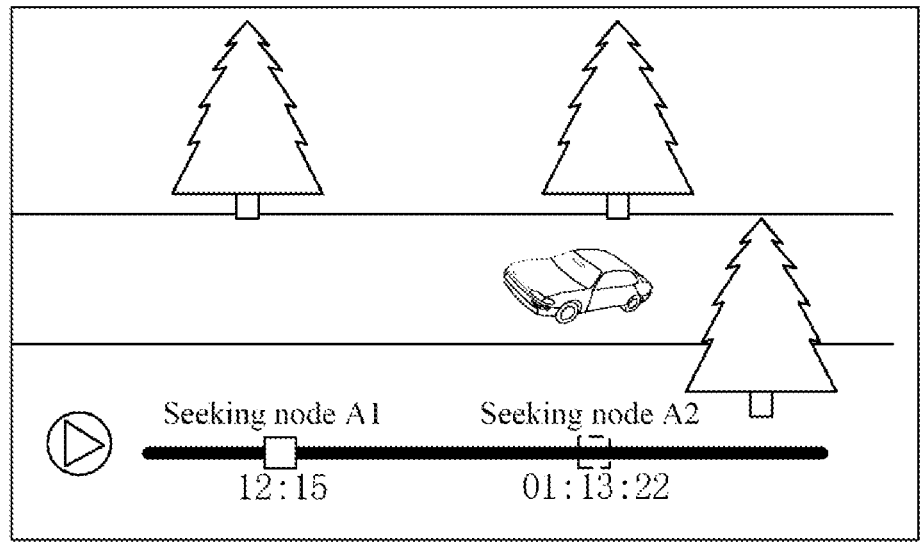
FIG. 8 is a schematic diagram of node time information of a seeking node provided by an embodiment of the present disclosure.

Specifically, there is a preset mapping relationship between a position of a seeking node on a progress bar and node time information of the seeking node. FIG. 8 is a schematic diagram of node time information of a seeking node provided by an embodiment of the present disclosure, referring to FIG. 8, the seeking nodes correspond to node time information respectively, and the node time information may be used to represent a playing position of the video, as shown in FIG. 8, a seeking node A1 corresponds to 12 minutes, 15 seconds, and a seeking node A2 corresponds to 1 hour, 13 minutes, 22 seconds.

Step S2032: determining, according to a variation between each of the node time information, the second playing node.

Figure 9:
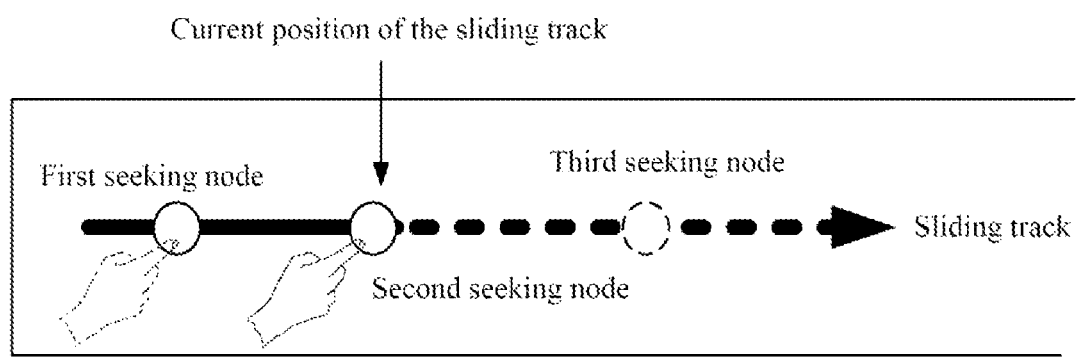
FIG. 9 is a schematic diagram of determining a second playing node according to a seeking node provided by an embodiment of the present disclosure.

In the embodiment of the present disclosure, the seeking nodes include at least a first seeking node and a second seeking node, where a sliding track corresponding to the first seeking information passes through the first seeking node and the second seeking node successively. Specifically, FIG. 9 is a schematic diagram of determining the second playing node according to a seeking node provided by an embodiment of the present disclosure, referring to FIG. 9, the first seeking information input by the user corresponds to a sliding track, and as the sliding track extends, the sliding track passes through the first seeking node and the second seeking node successively, after the sliding track reaches a position of the second seeking node, by obtaining node time information at positions of the first seeking node and the second seeking node, node time information of a next seeking node on the sliding track, for example, a third seeking node, may be predicted according to a changing situation between node time information of at least two seeking nodes, and then the third seeking node is taken as the predicted second playing node.

Figure 10:
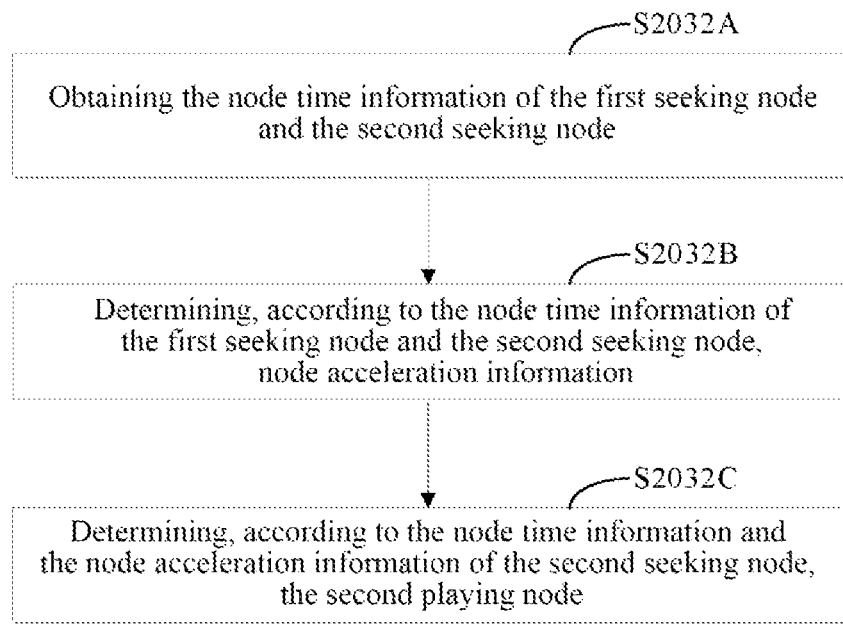
FIG. 10 is a possible implementation of step S2032 provided by an embodiment of the present disclosure.

Referring to FIG. 10, FIG. 10 is a possible implementation of step S2032 provided by an embodiment of the present disclosure, where the step S2032 includes the following steps.

Step S2032A: obtaining the node time information of the first seeking node and the second seeking node.

In the embodiment of the present disclosure, the first seeking node and the second seeking node are two seeking nodes passed through successively after a start of the sliding track, for example, the first seeking node is located at a first preset pixel unit passed through by the sliding track, and the second seeking node is located at a twentieth preset pixel unit passed through by the sliding track. The first seeking node and the second seeking node respectively correspond to a piece of node time information, for example, the first seeking node corresponds to 1 minute, 03 seconds of the video, and the second seeking node corresponds to 1 minute, 06 seconds of the video.

Step S2032B: determining, according to the node time information of the first seeking node and the second seeking node, node acceleration information.

In the embodiment of the present disclosure, the node time information includes system time and a display timestamp. The system time is operating system time of the terminal device executing the method for video seeking and playing provided by the embodiment of the present disclosure, for example, 16:21:12 on Jul. 15, 2020. The display timestamp is the displayed video playing time, for example, 30 minutes, 03 seconds. The difference value between display timestamps of the first seeking node and the second seeking node is equivalent to length of the played video after the sliding track passes through the first seeking node and the second seeking node; and the difference value between system time of the first seeking node and the second seeking node is equivalent to objective duration elapsed after the sliding track passes through the first seeking node and the second seeking node. Therefore, the ratio of the length of the played video to the objective duration is the speed of the sliding track at the second seeking node, that is, the video seeking speed at the second seeking node.

Specifically, according to a ratio of the difference value between the display timestamp of the second seeking node and the display timestamp of the first seeking node to the difference value between the system time of the second seeking node and the system time of the first seeking node, instantaneous speed information of the second seeking node is determined.

Since the user does not make the sliding track to seek the video playing progress at a constant speed, and accelerates or decelerates within a certain time range, therefore, after determining the instantaneous speed information of the second seeking node, acceleration information of the second seeking node is determined according to the instantaneous speed information of the second seeking node, in order to realize more accurate prediction of the sliding track, and further realize more accurate prediction of the second playing node.

Step S2032C: determining, according to the node time information and the node acceleration information of the second seeking node, the second playing node.

Specifically, instantaneous speed information of the second playing node is determined according to the acceleration information and the instantaneous speed information of the second seeking node; a target movement amount is determined according to the instantaneous speed information of the second playing node and system time between the first seeking node and the second seeking node; and the second playing node is determined according to the display timestamp of the second seeking node and the target movement amount.

In order to better disclose a process of determining the second playing node, a more specific embodiment is described below.

Figure 11:
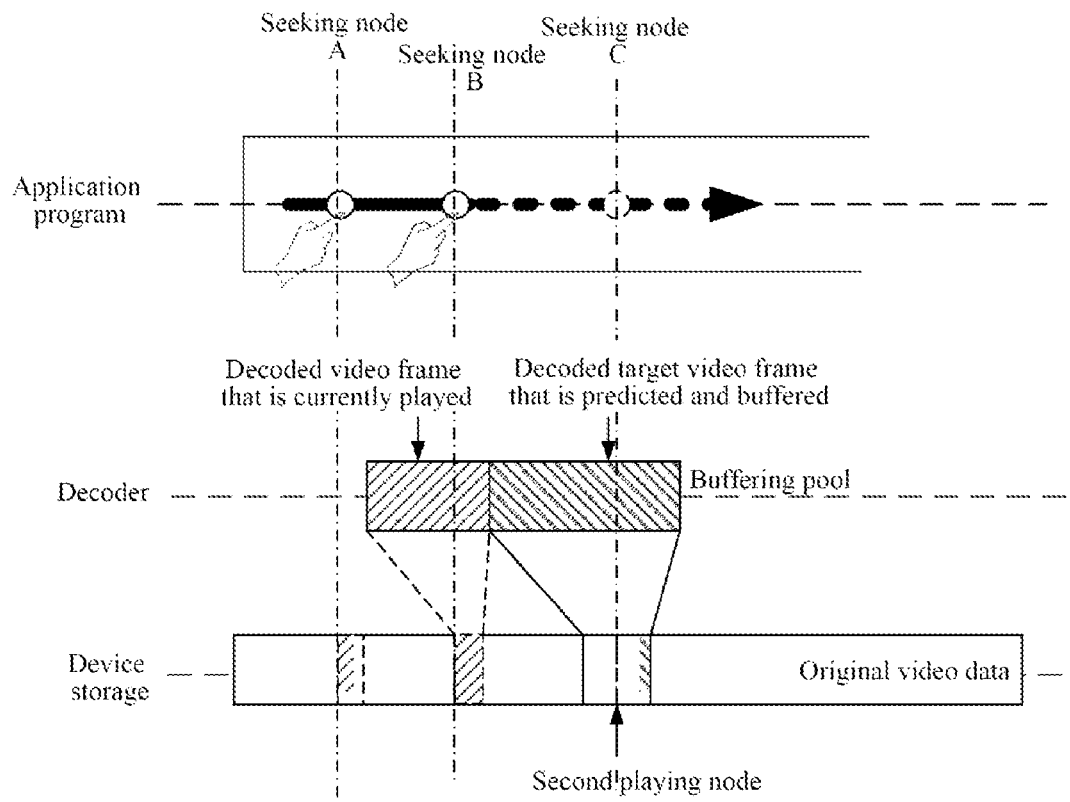
FIG. 11 is a schematic diagram of determining a second playing node provided by an embodiment of the present disclosure.

FIG. 11 is a schematic diagram of determining a second playing node provided by an embodiment of the present disclosure, referring to FIG. 11, a user adjusts a video playing progress by making a sliding track on a touch screen of a terminal device, the terminal device receives first seeking information corresponding to the sliding track, predicts the second playing node according to the first seeking information, determines the second playing node, and determines video data within a preset range before and after the second playing node as a target video frame.

For example, before a process that the user makes the sliding track, a video may be in a state of being played, being stopped or being fast forwarded, the user performs a seeking operation by sliding a video playing progress bar, and the corresponding sliding track first passes through a seeking node A, at this time, the terminal device records system time sys_time_t0 and a display timestamp video_time_x0 of the seeking node A. Then, a seeking node B is passed through along the sliding track, and the terminal device records system time sys_time_t1 and a display timestamp video_time_x1 of the seeking node B. At this time, according to formula (1), instantaneous speed information spd_v1 of the seeking node B is determined as:

$$\text{spd\_v1} = \text{(video\_time\_x1} - \text{video\_time\_x0)/(sys\_time\_t1} - \text{sys\_time\_t0)} \quad (1)$$

It can be seen that, on the sliding track, instantaneous speed information of a next seeking node may be recursively obtained according to node time information of a previous seeking node and node time information of the next seeking node. In one embodiment, instantaneous speed information of a first seeking node may be 0 or a preset speed value.

Therefore, instantaneous speed information spd_v0 of the seeking node A may be determined according to node time information of a previous seeking node of the seeking node A, or the instantaneous speed information of the seeking node A may be 0 or a preset speed value.

Further, acceleration information of the seeking node B may be determined according to the instantaneous speed information of the seeking node A and the instantaneous speed information of the seeking node B, specifically, as shown in formula (2), the acceleration information acc_a1 of the seeking node B is:

$$\text{acc\_a1} = \text{(spd\_v1} - \text{spd\_v0)/(sys\_time\_t1} - \text{sys\_time\_t0)} \quad (2)$$

Further, instantaneous speed information predict_spd_v2 of a seeking node C after the seeking node B may be predicted according to the acceleration information of the seeking node B, specifically, as shown in formula (3), the instantaneous speed information predict_spd_v2 of the seeking node C is:

$$\text{predict\_spd\_v2} = \text{acc\_a1} * \text{(sys\_time\_t1} - \text{sys\_time\_t0)} + \text{spd\_v1} \quad (3)$$

Then, a time interval between the seeking node C and the seeking node B is predicted, to obtain the predicted time interval predict_delta_x, specifically, as shown in formula (4), the predicted time interval predict_delta_x between the seeking node C and the seeking node B is:

$$\text{predict\_delta\_x} = \quad (4)$$
$$\text{(spd\_v1} + \text{predict\_spd\_v2)/2} * \text{(sys\_time\_t1} - \text{sys\_time\_t0)}$$

Finally, a display timestamp position predict_Pts of the seeking node C may be obtained according to the display timestamp video_time_x1 of the seeking node B and the predicted time interval predict_delta_x, specifically, as shown in formula (5), the display timestamp position predict_Pts of the seeking node C is:

$$\text{predict\_Pts} = \text{video\_time\_x1} + \text{predict\_delta\_x} \quad (5)$$

The seeking node C is the predicted second playing node, and a distance between the seeking node C and the seeking node B may be the same as or different from a distance between the seeking node B and the seeking node A. In the embodiment of the present disclosure, through the first seeking information, when the sliding track corresponding to the first seeking information moves to the seeking node B, the position of the seeking node C may be predicted, then the seeking node C is used as the second playing node for decoding and buffering, and when the second seeking information is received and the playing node indicated by the second seeking information is the second playing node, the play can be performed directly without real-time decoding, avoiding lag and improving smoothness of the video play.

The distance between the seeking node A and the seeking node B may be regarded as a minimum seeking distance, the shorter the minimum seeking distance is, the more accurate the video seeking is, and correspondingly, the larger an amount of prediction, calculation and decoding required by a system is, and the greater the system burden is; conversely, the longer the minimum seeking distance is, the less accurate the video seeking is, and correspondingly, the smaller the amount of prediction, calculation, and decoding required by the system is, and the smaller the system burden is. In one embodiment, the terminal device determines the distance between the seeking node A and the seeking node B according to preset device load information. According to load condition of the device, a distance between a seeking node A and a seeking node B which are matched is determined, so that resource consumption of calculation and prediction during the video seeking does not exceed load capacity of the device, avoiding video lag.

Step S204: buffering the target video frame corresponding to the second playing node in a preset buffering pool.

In a possible implementation manner, the second playing node includes playing time information, and the playing time information is used to represent a time position of the target video frame in all video data.

In the embodiment of the present disclosure, the buffering the target video frame in the preset buffering pool includes: determining, according to a preset playing time mapping table, identification information corresponding to the playing time information from all the video data; determining, according to the identification information, the target video frame; and decoding the target video frame, and buffering the decoded and to-be-played video data in the buffering pool.

In another possible implementation manner, the second playing node includes playing ratio information, and the playing ratio information is used to represent a ratio position of the target video frame in all the video data. The buffering the target video frame in the preset buffering pool includes: determining, according to a preset playing ratio mapping table, identification information corresponding to the playing ratio information from all the video data; determining, according to the identification information, the target video frame; and decoding the target video frame, and buffering the decoded and to-be-played video data in the buffering pool.

Step S205: performing down-sampling on the target video frame to obtain a down-sampled video.

In the embodiment of the present disclosure, after the target video frame is determined, the target video frame is first down-sampled to reduce an amount of data to obtain lower-quality video frame data, that is, the down-sampled video, and then the down-sampled video is decoded and buffered, which can reduce system load and improve data processing efficiency.

Step S206: if the playing node indicated by the second seeking information is the second playing node, playing the down-sampled video in a preset preview window.

For example, when it is determined that the playing node indicated by the second seeking information is the second playing node, the compressed down-sampled video is played in the preview window, and since the preview window is not a main way for a user to watch the video, it is not necessary to display high-precision video, therefore, influence on previewing the video by the user is avoided, and at the same time, since video volume is compressed, the system load is reduced and the data processing efficiency is improved.

Figure 12:
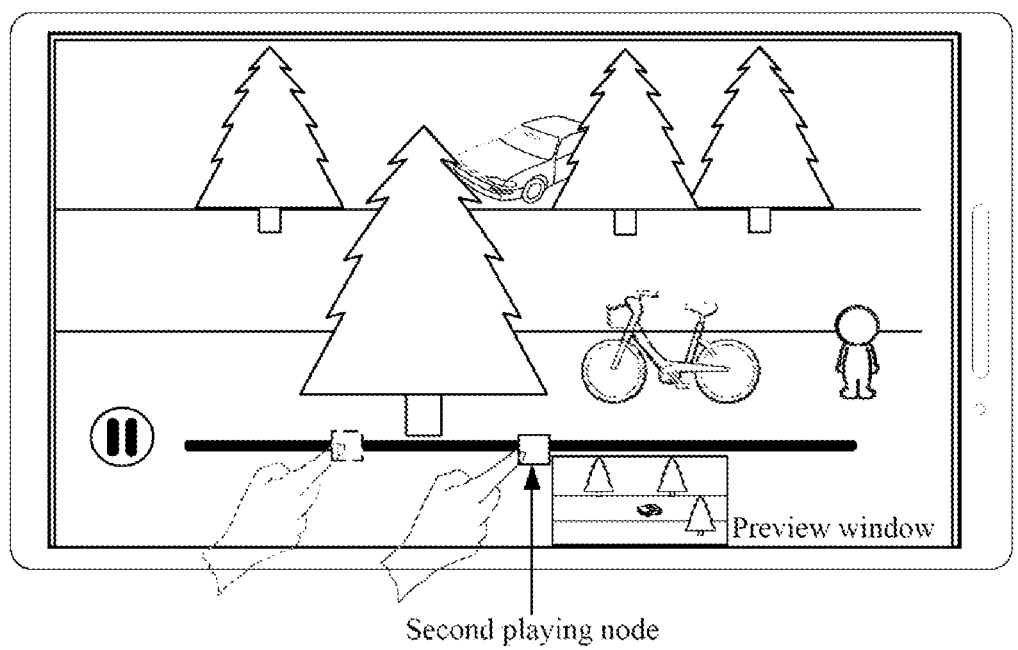
FIG. 12 is a schematic diagram of an application program UI including a preview window provided by an embodiment of the present disclosure.

FIG. 12 is a schematic diagram of an application program UI including a preview window provided by an embodiment of the present disclosure. Referring to FIG. 12, after the down-sampled target video frame is buffered, when the video is sought to the second playing node corresponding to the target video frame, the down-sampled and buffered target video frame is played in a preview window of an application. Usually, a purpose that a user performs a video seeking operation is to locate an interested video clip, not to watch specific content during a seeking process, and in the preview window, there is generally a small window that provides the user with a video preview function, thus the purpose that the user performs the video seeking operation is better matched. In the preview window, even if with a high quality, the video cannot be fully reflected in the preview window, instead, due to the need to process the high-quality video, a large load is caused on the system, resulting in a waste of system resources. Therefore, in the process of the video seeking and playing, by down-sampling or compressing the target video frame and playing the target video frame in the preview window, processing pressure and comprehensive load of the system during the video seeking play can be reduced, smoothness of seeking during the video seeking play can be improved, and a purpose of locating and finding interested video clips when the user perform video seeking is better achieved.

In the present embodiment, step S201 is consistent with step S101 in the above-mentioned embodiment, and for detailed description, please refer to the description of step S101, which is not be repeated here.

Figure 13:
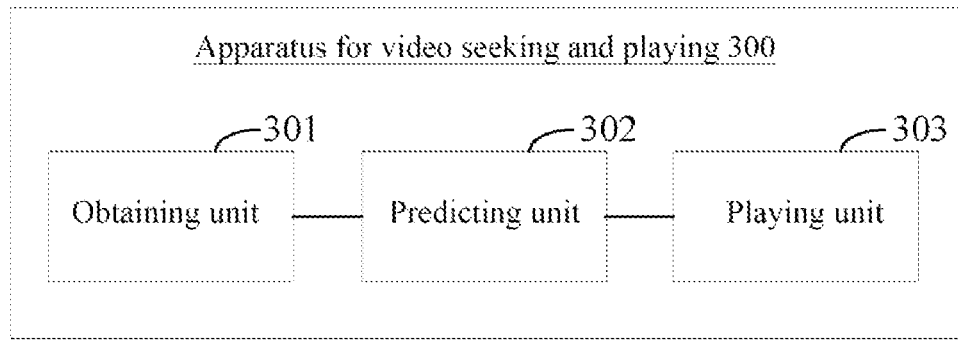
FIG. 13 is a structural block diagram of an apparatus for video seeking and playing provided by an embodiment of the present disclosure.

Corresponding to the method for video seeking and playing in the above embodiments, FIG. 13 is a structural block diagram of an apparatus for video seeking and playing provided by an embodiment of the present disclosure. In order to facilitate explanations, only parts related to the embodiment of the present disclosure are shown. Referring to FIG. 13, the apparatus for video seeking and playing 300 includes:

an obtaining unit 301, configured to obtain first seeking information input by a user, and determine a first playing node indicated by the first seeking information;

a predicting unit 302, configured to predict, according to the first seeking information, a second playing node, and buffer a target video frame corresponding to the second playing node in a buffering pool, where the second playing node is after the first playing node;

a playing unit 303, configured to obtain second seeking information input by the user, and if a playing node indicated by the second seeking information is the second playing node, play the target video frame in the buffering pool.

In an embodiment of the present disclosure, the first seeking information includes a plurality of seeking nodes, and the predicting unit 302 is specifically configured to: obtain node time information of each of the seeking nodes; and determine, according to a variation between each of node time information, the second playing node.

In an embodiment of the present disclosure, the plurality of seeking nodes include a first seeking node and a second seeking node, and the second seeking node is after the first seeking node; and when determining, according to the variation between each of the node time information, the second playing node, the predicting unit 302 is specifically configured to: obtain node time information of the first seeking node and node time information of the second seeking node; determine, according to the node time information of the first seeking node and the node time information of the second seeking node, node acceleration information of the second seeking node; and determine, according to the node time information of the second seeking node and the node acceleration information of the second seeking node, the second playing node.

In an embodiment of the present disclosure, the node time information includes system time and a display timestamp, and when determining, according to the node time information of the first seeking node and the node time information of the second seeking node, the node acceleration information of the second seeking node, the predicting unit 302 is specifically configured to: determine, according to a ratio of the difference value between a display timestamp of the second seeking node and a display timestamp of the first seeking node to the difference value between system time of the second seeking node and system time of the first seeking node, instantaneous speed information of the second seeking node; and determine, according to the instantaneous speed information of the second seeking node, the acceleration information of the second seeking node.

In an embodiment of the present disclosure, when determining, according to the node time information and the node acceleration information of the second seeking node, the second playing node, the predicting unit 302 is specifically configured to: determine, according to the acceleration information and the instantaneous speed information of the second seeking node, instantaneous speed information of the second playing node; determine, according to a product of the difference value between the system time of the first seeking node and the system time of the second seeking node and the instantaneous speed information of the second playing node, a target movement amount; and determine, according to the display timestamp of the second seeking node and the target movement amount, the second playing node.

In an embodiment of the present disclosure, the second playing node includes playing time information, and the playing time information is used to represent a time position of the target video frame in all video data, and when buffering the target video frame corresponding to the second playing node in the preset buffering pool, the predicting unit 302 is specifically configured to: determine, according to a preset playing time mapping table, identification information corresponding to the playing time information from all the video data; determine, according to the identification information, the target video frame; and decode the target video frame, and buffer the target video frame in the buffering pool.

In an embodiment of the present disclosure, the second playing node includes playing ratio information, and the playing ratio information is used to represent a ratio position of the target video frame in all the video data, and when buffering the target video frame corresponding to the second playing node in the preset buffering pool, the predicting unit 302 is specifically configured to: determine, according to a preset playing ratio mapping table, identification information corresponding to the playing ratio information from all the video data; determine, according to the identification information, the target video frame; and decode the target video frame, and buffer the target video frame in the buffering pool.

In an embodiment of the present disclosure, the playing unit 303 is further configured to: down-sample the target video frame to obtain a down-sampled video; and when playing the target video frame in the buffering pool, the playing unit 303 is specifically configured to: play the down-sampled video in a preset preview window.

The apparatus for video seeking and playing 300 provided in the present embodiment may be used to implement the technical solution of the aforementioned method embodiments, and implementation principles and technical effects thereof are similar, which are not repeated in the present embodiment.

Figure 14:
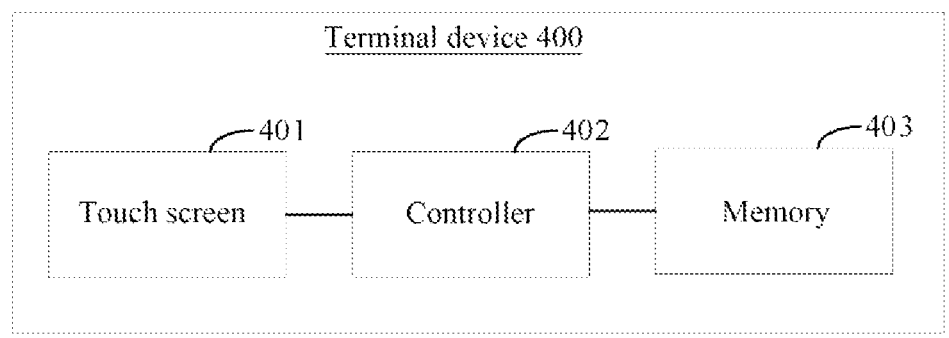
FIG. 14 is a structural block diagram of a terminal device provided by an embodiment of the present disclosure.

FIG. 14 is a structural block diagram of a terminal device provided by an embodiment of the present disclosure. In order to facilitate explanations, only parts related to the embodiment of the present disclosure are shown. Referring to FIG. 14, a terminal device 400 includes: a touch screen 401, a controller 402 and a memory 403.

The touch screen 401 is configured to obtain first seeking information input by a user.

The controller 402 is configured to determine a first playing node indicated by the first seeking information; predict, according to the first seeking information, a second playing node, and buffer a target video frame corresponding to the second playing node in the memory 403, where the second playing node is after the first playing node.

The touch screen 401 is further configured to obtain second seeking information input by the user, and if a playing node indicated by the second seeking information is the second playing node, play the target video frame in the memory 403.

In an embodiment of the present disclosure, the first seeking information includes a plurality of seeking nodes, and the controller 402 is specifically configured to: obtain node time information of each of the seeking nodes; and determine, according to a variation between each of the node time information, the second playing node.

In an embodiment of the present disclosure, the plurality of seeking nodes include a first seeking node and a second seeking node, and the second seeking node is after the first seeking node; and when determining, according to the variation between each of the node time information, the second playing node, the controller 402 is specifically configured to: obtain node time information of the first seeking node and node time information of the second seeking node; determine, according to the node time information of the first seeking node and the node time information of the second seeking node, node acceleration information of the second seeking node; and determine, according to the node time information of the second seeking node and the node acceleration information of the second seeking node, the second playing node.

In an embodiment of the present disclosure, the node time information includes system time and a display timestamp, and when determining, according to the node time information of the first seeking node and the node time information of the second seeking node, the node acceleration information of the second seeking node, the controller 402 is specifically configured to: determine, according to a ratio of the difference value between a display timestamp of the second seeking node and a display timestamp of the first seeking node to the difference value between system time of the second seeking node and system time of the first seeking node, instantaneous speed information of the second seeking node; and determine, according to the instantaneous speed information of the second seeking node, the acceleration information of the second seeking node.

In an embodiment of the present disclosure, when determining, according to the node time information and the node acceleration information of the second seeking node, the second playing node, the controller 402 is specifically configured to: determine, according to the acceleration information and the instantaneous speed information of the second seeking node, instantaneous speed information of the second playing node; determine, according to a product of the difference value between the system time of the first seeking node and the system time of the second seeking node and the instantaneous speed information of the second playing node, a target movement amount; and determine, according to the display timestamp of the second seeking node and the target movement amount, the second playing node.

In an embodiment of the present disclosure, the second playing node includes playing time information, and the playing time information is used to represent a time position of the target video frame in all video data, and when buffering the target video frame corresponding to the second playing node in the memory 403, the controller 402 is specifically configured to: determining, according to a preset playing time mapping table, identification information corresponding to the playing time information from all the video data; determine, according to the identification information, the target video frame; and decode the target video frame, and buffer the target video frame in the memory 403.

In an embodiment of the present disclosure, the second playing node includes playing ratio information, and the playing ratio information is used to represent a ratio position of the target video frame in all the video data, and when buffering the target video frame corresponding to the second playing node in the memory 403, the controller 402 is specifically configured to: determining, according to a preset playing ratio mapping table, identification information corresponding to the playing ratio information from all the video data; determine, according to the identification information, the target video frame; and decode the target video frame, and buffer the target video frame in the memory 403.

In an embodiment of the present disclosure, the controller 402 is further configured to: down-sample the target video frame to obtain a down-sampled video; and when playing the target video frame in the memory 403, the touch screen 401 is specifically configured to: play the down-sampled video in a preset preview window.

The terminal device 400 provided in the present embodiment may be used to implement the technical solution of the aforementioned method embodiments, and implementation principles and technical effects thereof are similar, which are not repeated in the present embodiment.

Figure 15:
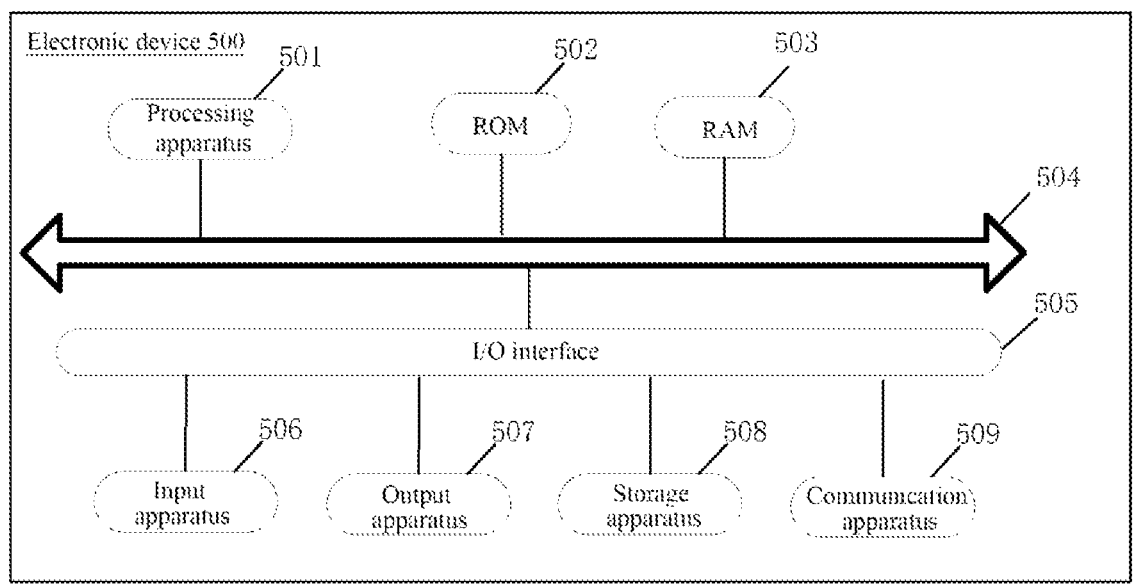
FIG. 15 is a structural block diagram of an electronic device provided by an embodiment of the present disclosure.

Referring to FIG. 15, FIG. 15 shows a schematic structural diagram suitable for implementing an electronic device 500 of an embodiment of the present disclosure, and the electronic device 500 may be a terminal device or a server. The electronic device may include, but is not limited to, a mobile terminal such as a mobile phone, a laptop, a digital broadcast receiver, a PDA (Personal Digital Assistant, for short: PDA), a tablet computer, a portable media player (for short: PMP), and an on-board terminal (for example, an on-board navigation terminal), and a fixed terminal such as a digital TV and a desktop computer, etc. The electronic device shown in FIG. 15 is only an example, and should not cause any restriction on functions and application scope of the embodiment of the present disclosure.

As shown in FIG. 15, the electronic device 500 may include a processing apparatus (for example, a central processor, a graphics processor, etc.) 501, which may perform various appropriate actions and processing according to a program stored in a read only memory (for short: ROM) 502 or a program loaded into a random access memory (for short: RAM) 503 from a storage apparatus 508. In the RAM 503, various programs and data required for operations of the electronic device 500 are also stored. The processing apparatus 501, the ROM 502 and the RAM 503 are connected to each other through a bus 504. An input/output (I/O) interface 505 is also connected to the bus 504.

Generally, following apparatuses may be connected to the I/O interface 505: an input apparatus 506 including, for example, a touch screen, a touch pad, a keyboard, a mouse, a camera, a microphone, an accelerometer, a gyroscope, etc.; an output apparatus 507, including, for example, a liquid crystal display (for short: LCD), a speaker, a vibrator, etc.; a storage apparatus 508 including, for example, a magnetic tape and a hard disk, etc.; and a communication apparatus 509. The communication apparatus 509 may allow the electronic device 500 to perform a wireless or wired communication with other devices to exchange data. Although FIG. 14 shows an electronic device 500 with various apparatuses, it should be understood that it is not required to implement or provide all the shown apparatuses. More or fewer apparatuses may alternatively be implemented or provided.

In particular, according to the embodiments of the present disclosure, a process described above with reference to a flowchart may be implemented as a computer software program. For example, the embodiments of the present disclosure include a computer program product, which includes a computer program carried on a computer readable medium, and the computer program containing program code for performing a method shown in the flowchart. In such embodiments, the computer program may be downloaded and installed from a network through the communication apparatus 509, or installed from the storage apparatus 508 or from the ROM 502. When executed by the processing apparatus 501, the computer program implements the aforementioned functions defined in the method of the embodiments of the present disclosure. The embodiments of the present disclosure further include a computer program which, when executed by a processor, is used to implement the aforementioned functions defined in the method of the embodiments of the present disclosure.

It should be noted that the computer readable medium described above in the present disclosure may be a computer readable signal medium or a computer readable storage medium or any combination thereof. The computer readable storage medium may be, for example, but not limited to, an electrical, magnetic, optical, electromagnetic, infrared, or semiconductor system, apparatus or equipment, or any combination thereof. More specific examples of the computer readable storage medium may include, but are not limited to, an electrical connection with one or more wires, a portable computer disk, a hard disk, a random access memory (RAM), a read only memory (ROM), an erasable programmable read only memory (EPROM), a flash memory, an optical fiber, a portable compact disk-read only memory (CD-ROM), an optical storage equipment, a magnetic storage equipment, or any suitable combination thereof. In the present disclosure, the computer readable storage medium may be any tangible medium that contains or stores a program, and the program may be used by or in combination with an instruction executing system, apparatus or equipment. And in the present disclosure, the computer readable signal medium may include a data signal propagated in baseband or as a part of a carrier wave, in which computer readable program code is carried. This kind of propagated data signal may be in a plurality of forms, including but not limited to an electromagnetic signal, an optical signal or any suitable combination thereof. The computer readable signal medium may also be any computer readable medium other than the computer readable storage medium, and the computer readable signal medium may send, propagate or transmit a program which is used by or in combination with an instruction executing system, apparatus or equipment. Program code contained in the computer readable medium may be transmitted by any suitable medium, including but not limited to: an electric wire, an optical cable, RF (radio frequency), etc., or any suitable combination thereof.

The computer readable medium may be included in the aforementioned electronic device; or may exist alone without being assembled into the electronic device.

The aforementioned computer readable medium carries one or more programs, and when executed by the electronic device, the one or more programs cause the electronic device to implements the method shown in the aforementioned embodiments.

Computer program codes for implementing operations in the present disclosure may be written in one or more programming languages or a combination thereof, and the aforementioned programming languages includes but are not limited to object-oriented programming languages such as Java, Smalltalk and C++, as well as conventional procedural programming languages such as "C" language or similar programming languages. The program code may be completely executed on a user's computer, partially executed on a user's computer, executed as an independent software package, partially executed on a user's computer and partially executed on a remote computer, or completely executed on a remote computer or a server. In a condition of involving the remote computer, the remote computer may be connected to the user's computer through any kind of networks, including a local area network (for short: LAN) or a wide area network (for short: WAN), or may be connected to an external computer (for example, being connected through the Internet with Internet service providers).

Flowcharts and block diagrams in the drawings illustrate architectures, functions and operations of possible implementations of systems, methods and computer program products according to various embodiments of the present disclosure. In this regard, each block in the flowcharts or block diagrams may represent a module, a program segment, or a part of code, and the module, the program segment or the part of code contains one or more executable instructions for implementing specified logical functions. It should also be noted that in some alternative implementations, the functions labeled in the blocks may also occur in a different order than those labeled in the drawings. For example, two blocks shown in succession may actually be executed substantially in parallel, and sometimes they may be executed in a reverse order, which depends on functions involved. It should also be noted that each block in the block diagrams and/or flowcharts, and combinations of blocks in the block diagrams and/or flowcharts, may be implemented by a dedicated hardware-based system which implements specified functions or operations, or may be implemented by a combination of dedicated hardware and computer instructions.

Units described in the embodiments of the present disclosure may be implemented by software or hardware. Where in some cases, names of the units do not constitute a limitation on the units per se.

The functions described above herein may be at least partially executed by one or more hardware logic components. For example, without limitation, an exemplary type of hardware logic component that may be used includes: a field programmable gate array (FPGA), an application specific integrated circuit (ASIC), an application specific standard product (ASSP), a system on chip (SOC), a complex programmable logic device (CPLD), etc.

In the context of the present disclosure, a machine readable medium may be a tangible medium which may contain or store a program to be used by or in combination with an instruction executing system, apparatus or equipment. The machine readable medium may be a machine readable signal medium or a machine readable storage medium. The machine readable medium may include, but is not limited to, an electrical, magnetic, optical, electromagnetic, infrared, or semiconductor system, apparatus or equipment, or any combination thereof. More specific examples of the machine readable storage medium may include, an electrical connection based on one or more wires, a portable computer disk, a hard disk, a random access memory (RAM), a read only memory (ROM), an erasable programmable read only memory (EPROM), a flash memory, an optical fiber, a portable compact disk-read only memory (CD-ROM), an optical storage equipment, a magnetic storage equipment, or any suitable combination thereof.

In the first aspect, according to one or more embodiments of the present disclosure, a method for video seeking and playing is provided, including:

obtaining first seeking information input by a user; determining a first playing node indicated by the first seeking information; predicting, according to the first seeking information, a second playing node, and buffering a target video frame corresponding to the second playing node in a buffering pool, where the second playing node is after the first playing node; and obtaining second seeking information input by the user, and if a playing node indicated by the second seeking information is the second playing node, playing the target video frame in the buffering pool.

According to one or more embodiments of the present disclosure, the first seeking information includes a plurality of seeking nodes, and the predicting, according to the first seeking information, the second playing node includes: obtaining node time information of each of the seeking nodes; and determining, according to a variation between each of the node time information, the second playing node.

According to one or more embodiments of the present disclosure, the plurality of seeking nodes include a first seeking node and a second seeking node, and the second seeking node is after the first seeking node; and the determining, according to the variation between each of the node time information, the second playing node includes: obtaining node time information of the first seeking node and node time information of the second seeking node; determining, according to the node time information of the first seeking node and the node time information of the second seeking node, node acceleration information of the second seeking node; and determining, according to the node time information of the second seeking node and the node acceleration information of the second seeking node, the second playing node.

According to one or more embodiments of the present disclosure, the node time information includes system time and a display timestamp, and the determining, according to the node time information of the first seeking node and the node time information of the second seeking node, the node acceleration information of the second seeking node includes: determining, according to a ratio of the difference value between a display timestamp of the second seeking node and a display timestamp of the first seeking node to the difference value between system time of the second seeking node and system time of the first seeking node, instantaneous speed information of the second seeking node; and determining, according to the instantaneous speed information of the second seeking node, the node acceleration information of the second seeking node.

According to one or more embodiments of the present disclosure, the determining, according to the node time information and the node acceleration information of the second seeking node, the second playing node includes: determining, according to the acceleration information and the instantaneous speed information of the second seeking node, instantaneous speed information of the second playing node; determining, according to a product of the difference value between the system time of the first seeking node and the system time of the second seeking node and the instantaneous speed information of the second playing node, a target movement amount; and determining, according to the display timestamp of the second seeking node and the target movement amount, the second playing node.

According to one or more embodiments of the present disclosure, the second playing node includes playing time information, the playing time information is used to represent a time position of the target video frame in all video data, and the buffering the target video frame corresponding to the second playing node in the buffering pool includes: determining, according to a preset playing time mapping table, identification information corresponding to the playing time information from all the video data; determining, according to the identification information, the target video frame; and decoding the target video frame, and buffering the target video frame in the buffering pool.

According to one or more embodiments of the present disclosure, the second playing node includes playing ratio information, the playing ratio information is used to represent a ratio position of the target video frame in all the video data, and the buffering the target video frame corresponding to the second playing node in the buffering pool includes: determining, according to a preset playing ratio mapping table, identification information corresponding to the playing ratio information from all the video data; determining, according to the identification information, the target video frame; and decoding the target video frame, and buffering the target video frame in the buffering pool.

According to one or more embodiments of the present disclosure, the method further includes: down-sampling the target video frame to obtain a down-sampled video; and the playing the target video frame in the buffering pool includes: playing the down-sampled video in a preset preview window.

In the second aspect, according to one or more embodiments of the present disclosure, an apparatus for video seeking and playing is provided, including:

- an obtaining unit, configured to obtain first seeking information input by a user, and determine a first playing node indicated by the first seeking information;
- a predicting unit, configured to predict a second playing node according to the first seeking information, and buffer a target video frame corresponding to the second playing node in a buffering pool, where the second playing node is after the first playing node;
- a playing unit, configured to obtain second seeking information input by the user, and if a playing node indicated by the second seeking information is the second playing node, play the target video frame in the buffering pool.

In an embodiment of the present disclosure, the first seeking information includes a plurality of seeking nodes, and the predicting unit is specifically configured to: obtain node time information of each of the seeking nodes; and determine, according to a variation between each of node time information, the second playing node.

In an embodiment of the present disclosure, the plurality of seeking nodes include a first seeking node and a second seeking node, and the second seeking node is after the first seeking node; and when determining, according to the variation between each of the node time information, the second playing node, the predicting unit is specifically configured to: obtain node time information of the first seeking node and node time information of the second seeking node; determine, according to the node time information of the first seeking node and the node time information of the second seeking node, node acceleration information of the second seeking node; and determine, according to the node time information of the second seeking node and the node acceleration information of the second seeking node, the second playing node.

In an embodiment of the present disclosure, the node time information includes system time and a display timestamp, and when determining, according to the node time information of the first seeking node and the node time information of the second seeking node, the node acceleration information of the second seeking node, the predicting unit is specifically configured to: determine, according to a ratio of the difference value between a display timestamp of the second seeking node and a display timestamp of the first seeking node to the difference value between system time of the second seeking node and system time of the first seeking node, instantaneous speed information of the second seeking node; and determine, according to the instantaneous speed information of the second seeking node, the acceleration information of the second seeking node.

In an embodiment of the present disclosure, when determining, according to the node time information and the node acceleration information of the second seeking node, the second playing node, the predicting unit is specifically configured to: determine, according to the acceleration information and the instantaneous speed information of the second seeking node, instantaneous speed information of the second playing node; determine, according to a product of the difference value between the system time of the first seeking node and the system time of the second seeking node and the instantaneous speed information of the second playing node, a target movement amount; and determine, according to the display timestamp of the second seeking node and the target movement amount, the second playing node.

In an embodiment of the present disclosure, the second playing node includes playing time information, and the playing time information is used to represent a time position of the target video frame in all video data, and when buffering the target video frame corresponding to the second playing node in the preset buffering pool, the predicting unit is specifically configured to: determine, according to a preset playing time mapping table, identification information corresponding to the playing time information from all the video data; determine, according to the identification information, the target video frame; and decode the target video frame, and buffer the target video frame in the buffering pool.

In an embodiment of the present disclosure, the second playing node includes playing ratio information, and the playing ratio information is used to represent a ratio position of the target video frame in all the video data, and when buffering the target video frame corresponding to the second playing node in the preset buffering pool, the predicting unit is specifically configured to: determine, according to a preset playing ratio mapping table, identification information corresponding to the playing ratio information from all the video data; determine, according to the identification information, the target video frame; and decode the target video frame, and buffer the target video frame in the buffering pool.

In an embodiment of the present disclosure, the playing unit is further configured to: down-sample the target video frame to obtain a down-sampled video; and when playing the target video frame in the buffering pool, the playing unit is specifically configured to: play the down-sampled video in a preset preview window.

In the third aspect, according to one or more embodiments of the present disclosure, a terminal device is provided, including a touch screen, a controller, and a memory.

The touch screen is configured to obtain first seeking information input by a user.

The controller is configured to determine a first playing node indicated by the first seeking information; predict, according to the first seeking information, a second playing node, and buffer a target video frame corresponding to the second playing node in the memory, where the second playing node is after the first playing node.

The touch screen is further configured to obtain second seeking information input by the user, and if a playing node indicated by the second seeking information is the second playing node, play the target video frame in the memory.

In an embodiment of the present disclosure, the first seeking information includes a plurality of seeking nodes, and the controller is specifically configured to: obtain node time information of each of the seeking nodes; and determine, according to a variation between each of the node time information, the second playing node.

In an embodiment of the present disclosure, the plurality of seeking nodes include a first seeking node and a second seeking node, and the second seeking node is after the first seeking node; and when determining, according to the variation between each of the node time information, the second playing node, the controller is specifically configured to: obtain node time information of the first seeking node and node time information of the second seeking node; determine, according to the node time information of the first seeking node and the node time information of the second seeking node, node acceleration information of the second seeking node; and determine, according to the node time information of the second seeking node and the node acceleration information of the second seeking node, the second playing node.

In an embodiment of the present disclosure, the node time information includes system time and a display timestamp, and when determining, according to the node time information of the first seeking node and the node time information of the second seeking node, the node acceleration information of the second seeking node, the controller is specifically configured to: determine, according to a ratio of the difference value between a display timestamp of the second seeking node and a display timestamp of the first seeking node to the difference value between system time of the second seeking node and system time of the first seeking node, instantaneous speed information of the second seeking node; and determine, according to the instantaneous speed information of the second seeking node, the acceleration information of the second seeking node.

In an embodiment of the present disclosure, when determining, according to the node time information and the node acceleration information of the second seeking node, the second playing node, the controller is specifically configured to: determine, according to the acceleration information and the instantaneous speed information of the second seeking node, instantaneous speed information of the second playing node; determine, according to a product of the difference value between the system time of the first seeking node and the system time of the second seeking node and the instantaneous speed information of the second playing node, a target movement amount; and determine, according to the display timestamp of the second seeking node and the target movement amount, the second playing node.

In an embodiment of the present disclosure, the second playing node includes playing time information, and the playing time information is used to represent a time position of the target video frame in all video data, and when buffering the target video frame corresponding to the second playing node in the memory, the controller is specifically configured to: determining, according to a preset playing time mapping table, identification information corresponding to the playing time information from all the video data; determine, according to the identification information, the target video frame; and decode the target video frame, and buffer the target video frame in the memory.

In an embodiment of the present disclosure, the second playing node includes playing ratio information, and the playing ratio information is used to represent a ratio position of the target video frame in all the video data, and when buffering the target video frame corresponding to the second playing node in the memory, the controller is specifically configured to: determining, according to a preset playing ratio mapping table, identification information corresponding to the playing ratio information from all the video data; determine, according to the identification information, the target video frame; and decode the target video frame, and buffer the target video frame in the memory.

In an embodiment of the present disclosure, the controller is further configured to: down-sample the target video frame to obtain a down-sampled video; and when playing the target video frame in the memory, the touch screen is specifically configured to: play the down-sampled video in a preset preview window.

In the fourth aspect, according to one or more embodiments of the present disclosure, an electronic device is provided, including: at least one processor and a memory; the memory stores a computer executable instruction; and the at least one processor executes the computer executable instruction stored in the memory to enable the at least one processor to implement the method for video seeking and playing described in the above first aspect and various possible designs of the first aspect.

In the fifth aspect, according to one or more embodiments of the present disclosure, a computer readable storage medium is provided, the computer readable storage medium stores a computer executable instruction which, when executed by a processor, implements the method for video seeking and playing described in the above first aspect and various possible designs of the first aspect.

In the sixth aspect, the embodiments of the present disclosure provide a computer program product, including a computer program which, when executed by a processor, implements the method for video seeking and playing described in the above first aspect and various possible designs of the first aspect.

In the seventh aspect, the embodiments of the present disclosure provide a computer program, which when executed by a processor, implements the method for video seeking and playing described in the above first aspect and various possible designs of the first aspect.

The above description is only preferred embodiments of the present disclosure and an explanation of applied technical principles. Persons skilled in the art should understand that the disclosed scope involved in the present disclosure is not limited to technical solutions formed by specific combinations of the aforementioned technical features, but also covers other technical solutions formed by any combination of the aforementioned technical features or equivalent features thereof without departing from the aforementioned inventive concept. For example, a technical solution is formed by mutually replacing the aforementioned features with technical features with similar functions disclosed in the present disclosure (but not limited to).

In addition, although operations are depicted in a particular order, this should not be understood as requiring the operations to be performed in the particular order shown or performed in sequential order. Under a certain circumstance, multitasking and parallel processing may be advantageous. Likewise, although the above discussion contains several specific implementation details, these should not be construed as limitations on the scope of the disclosure. Certain features that are described in the context of separate embodiments may also be implemented in combination in a single embodiment. Conversely, various features that are described in the context of a single embodiment may also be implemented in a plurality of embodiments separately or in any suitable sub-combination.

Although the subject matter has been described in languages specific to structural features and/or method logic actions, it should be understood that the subject matter defined in the appended claims is not necessarily limited to the specific features or actions described above. Instead, the specific features and actions described above are merely example forms of implementing the claims.

What is claimed is:

1. A method for video seeking and playing, comprising:
obtaining first seeking information input by a user, wherein the first seeking information comprises a plurality of seeking nodes;
determining a first playing node indicated by the first seeking information;
predicting, according to the first seeking information, a second playing node, and buffering a target video frame corresponding to the second playing node in a buffering pool, wherein the second playing node is after the first playing node; and
obtaining second seeking information input by the user, and if a playing node indicated by the second seeking information is the second playing node, playing the target video frame in the buffering pool,
wherein the predicting, according to the first seeking information, the second playing node comprises:
obtaining node time information of each of the plurality of seeking nodes; and
determining, according to a variation between each of the node time information, the second playing node.

2. The method according to claim 1, wherein the plurality of seeking nodes comprise a first seeking node and a second seeking node, and the second seeking node is after the first seeking node; and the determining, according to the variation between each of the node time information, the second playing node comprises:
obtaining node time information of the first seeking node and node time information of the second seeking node;
determining, according to the node time information of the first seeking node and the node time information of the second seeking node, node acceleration information of the second seeking node; and
determining, according to the node time information of the second seeking node and the node acceleration information of the second seeking node, the second playing node.

3. The method according to claim 2, wherein the node time information comprises system time and a display timestamp, and the determining, according to the node time information of the first seeking node and the node time information of the second seeking node, the node acceleration information of the second seeking node comprises:
determining, according to a ratio of a difference value between a display timestamp of the second seeking node and a display timestamp of the first seeking node to a difference value between system time of the second seeking node and system time of the first seeking node, instantaneous speed information of the second seeking node; and
determining, according to the instantaneous speed information of the second seeking node, the node acceleration information of the second seeking node.

4. The method according to claim 3, wherein the determining, according to the node time information of the second seeking node and the node acceleration information of the second seeking node, the second playing node comprises:
determining, according to the acceleration information and the instantaneous speed information of the second seeking node, instantaneous speed information of the second playing node;

determining, according to a product of the difference value between the system time of the first seeking node and the system time of the second seeking node and the instantaneous speed information of the second playing node, a target movement amount; and
determining, according to the display timestamp of the second seeking node and the target movement amount, the second playing node.

5. The method according to claim 1, wherein the second playing node comprises playing time information, the playing time information is used to represent a time position of the target video frame in all video data, and the buffering the target video frame corresponding to the second playing node in the buffering pool comprises:
determining, according to a preset playing time mapping table, identification information corresponding to the playing time information from all the video data;
determining, according to the identification information, the target video frame; and
decoding the target video frame, and buffering the target video frame in the buffering pool.

6. The method according to claim 1, wherein the second playing node comprises playing ratio information, the playing ratio information is used to represent a ratio position of the target video frame in all video data, and the buffering the target video frame corresponding to the second playing node in the buffering pool comprises:
determining, according to a preset playing ratio mapping table, identification information corresponding to the playing ratio information from all the video data;
determining, according to the identification information, the target video frame; and
decoding the target video frame, and buffering the target video frame in the buffering pool.

7. The method according to claim 1, further comprising:
down-sampling the target video frame to obtain a down-sampled video;
and the playing the target video frame in the buffering pool comprises:
playing the down-sampled video in a preset preview window.

8. A non-transitory computer readable storage medium, wherein the non-transitory computer readable storage medium stores a computer executable instruction which, when executed by a processor, implements the method for video seeking and playing according to claim 1.

9. An apparatus for video seeking and playing, comprising:
at least one processor and a memory, wherein
the memory stores a computer executable instruction, and
the at least one processor executes the computer executable instruction stored in the memory to enable the at least one processor to:
obtain first seeking information input by a user, and determine a first playing node indicated by the first seeking information;
predict, according to the first seeking information, a second playing node, and buffer a target video frame corresponding to the second playing node in a buffering pool, wherein the second playing node is after the first playing node; and
obtain second seeking information input by the user, and if a playing node indicated by the second seeking information is the second playing node, play the target video frame in the buffering pool, wherein the first seeking information comprises a plurality of seeking nodes, and the at least one processor is further enabled to:
obtain node time information of each of the plurality of seeking nodes; and
determine, according to a variation between each of the node time information, the second playing node.

10. The apparatus according to claim 9, wherein the plurality of seeking nodes comprise a first seeking node and a second seeking node, and the second seeking node is after the first seeking node; and the at least one processor is further enabled to:
obtain node time information of the first seeking node and node time information of the second seeking node;
determine, according to the node time information of the first seeking node and the node time information of the second seeking node, node acceleration information of the second seeking node; and
determine, according to the node time information of the second seeking node and the node acceleration information of the second seeking node, the second playing node.

11. The apparatus according to claim 10, wherein the node time information comprises system time and a display timestamp, and the at least one processor is further enabled to:
determine, according to a ratio of a difference value between a display timestamp of the second seeking node and a display timestamp of the first seeking node to a difference value between system time of the second seeking node and system time of the first seeking node, instantaneous speed information of the second seeking node; and
determine, according to the instantaneous speed information of the second seeking node, the acceleration information of the second seeking node.

12. The apparatus according to claim 11, wherein the at least one processor is further enabled to:
determine, according to the acceleration information and the instantaneous speed information of the second seeking node, instantaneous speed information of the second playing node;
determine, according to a product of the difference value between the system time of the first seeking node and the system time of the second seeking node and the instantaneous speed information of the second playing node, a target movement amount; and
determine, according to the display timestamp of the second seeking node and the target movement amount, the second playing node.

13. The apparatus according to claim 9, wherein the second playing node comprises playing time information, the playing time information is used to represent a time position of the target video frame in all video data, and the at least one processor is further enabled to:
determine, according to a preset playing time mapping table, identification information corresponding to the playing time information from all the video data;
determine, according to the identification information, the target video frame; and
decode the target video frame, and buffer the target video frame in the buffering pool.

14. The apparatus according to claim 9, wherein the second playing node comprises playing ratio information, the playing ratio information is used to represent a ratio position of the target video frame in all video data, and the at least one processor is further enabled to:
determine, according to a preset playing ratio mapping table, identification information corresponding to the playing ratio information from all the video data;
determine, according to the identification information, the target video frame; and
decode the target video frame, and buffer the target video frame in the buffering pool.

15. The apparatus according to claim 9, wherein the at least one processor is further enabled to:
down-sample the target video frame to obtain a down-sampled video; and
play the down-sampled video in a preset preview window.

16. A terminal device, comprising a touch screen, a controller and a memory, wherein
the touch screen is configured to obtain first seeking information input by a user, wherein the first seeking information comprises a plurality of seeking nodes;
the controller is configured to:
determine a first playing node indicated by the first seeking information;
predict, according to the first seeking information, a second playing node, and
buffer a target video frame corresponding to the second playing node in the memory, wherein the second playing node is after the first playing node;
the touch screen is further configured to obtain second seeking information input by the user, and if a playing node indicated by the second seeking information is the second playing node, play the target video frame in the memory; and
the controller is further configured to:
obtain node time information of each of the plurality of seeking nodes; and
determine, according to a variation between each of the node time information, the second playing node.

17. The terminal device according to claim 16, wherein the plurality of seeking nodes comprise a first seeking node and a second seeking node, and the second seeking node is after the first seeking node; and when determining, according to the variation between each of the node time information, the second playing node, the controller is further configured to:
obtain node time information of the first seeking node and node time information of the second seeking node;
determine, according to the node time information of the first seeking node and the node time information of the second seeking node, node acceleration information of the second seeking node; and
determine, according to the node time information of the second seeking node and the node acceleration information of the second seeking node, the second playing node.

* * * * *